H. B. LAYMAN.
NON-SKID AND TRACTION CHAIN.
APPLICATION FILED FEB. 6, 1919.

1,397,529.

Patented Nov. 22, 1921.
2 SHEETS—SHEET 1.

Inventor,
Helron Bernard Layman
By
ATTORNEY.

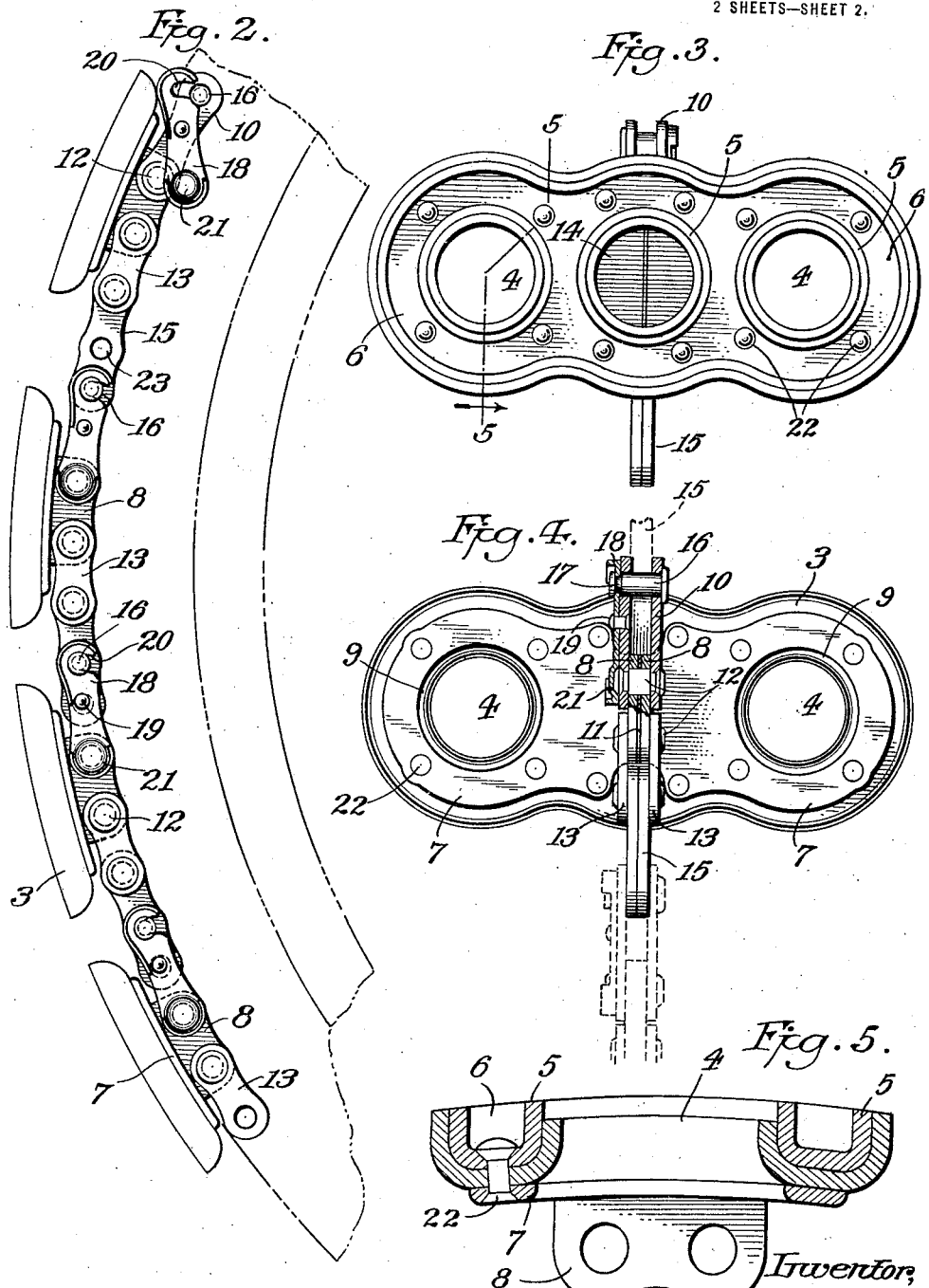

UNITED STATES PATENT OFFICE.

HEBRON BERNARD LAYMAN, OF NEW YORK, N. Y., ASSIGNOR TO NEVERSKID MANUFACTURING CO., INCORPORATED, A CORPORATION OF NEW YORK.

NON-SKID AND TRACTION CHAIN.

1,397,529.     Specification of Letters Patent.     Patented Nov. 22, 1921.

Application filed February 6, 1919. Serial No. 275,311.

*To all whom it may concern:*

Be it known that I, HEBRON BERNARD LAYMAN, a citizen of the United States of America, residing at New York city, borough of Manhattan, county and State of New York, have invented certain new and useful Improvements in Non-Skid and Traction Chains, of which the following is a specification.

My invention relates to non-skid or traction chains for elastic tired wheels and particularly applies to use on double tired wheels such as are employed on heavy trucks.

In an apparatus of this kind it is essential that the truck shall be preserved from the jarring action resulting from the wheel running up on the traction shoe or pad and then dropping down again upon the pavement or roadbed, and it is also desirable to have the construction in such form that a standard unit can be manufactured and shipped to dealers and users who can make these units up in chains to suit wheels of any size. My invention accomplishes these results and has certain other advantages evident to those skilled in the art. The best form of apparatus at present known to me embodying my invention is illustrated in the accompanying two sheets of drawings in which, Figure 1 is a side view of a wheel equipped with my invention.

Fig. 2 is a side view on an enlarged scale of a portion of the connected chain of units shown in Fig. 1, the rim of the wheel and one of the tires thereof being indicated in broken lines.

Fig. 3 is a face view of one of the stamped metal pads shown in Fig. 2.

Fig. 4 is a bottom view of the same, parts being shown in section.

Fig. 5 is a cross section on line 5—5 of Fig. 3, and

Throughout the drawings like parts are indicated by like reference characters.

Figure 1:
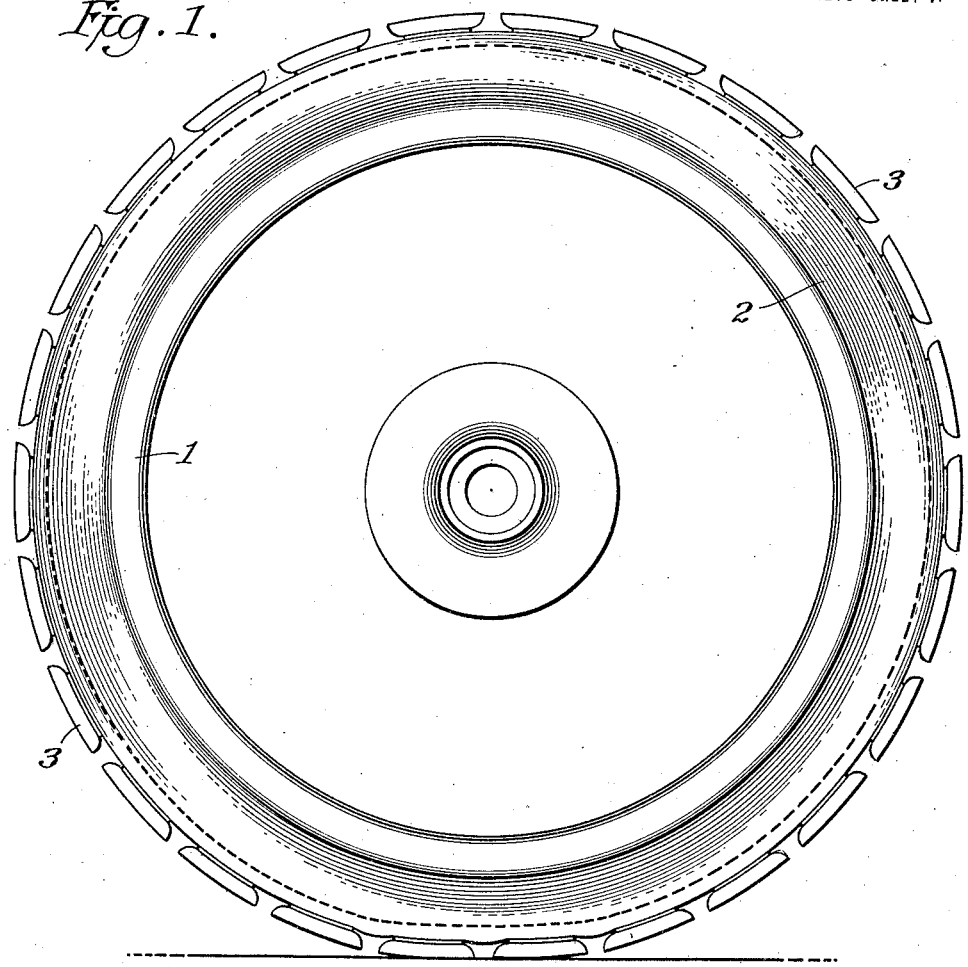

1, is the wheel which in the drawing is represented as of the disk type, and 2, 2, are the usual elastic tires such as are placed on the wheels of heavy trucks. The problem is to provide these tires with some durable form of skid-preventing and traction-creating attachment, which can be used in running over ice and snow in the winter and through mud at any time of year, and which attachment shall not have an injurious effect upon the tires, shall not create any substantial jolting or other inconvenience in the running of the truck over a hard pavement, and shall be durable and capable of adjustment to fit the wheels as the tires wear down or the attachment itself stretches slightly in use.

Figure 6:
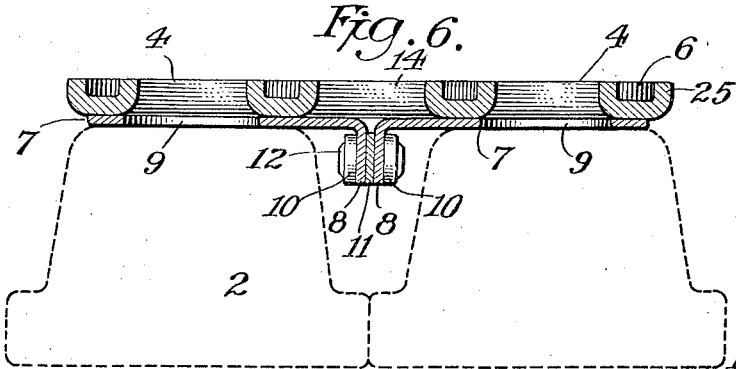
Fig. 6 is a longitudinal central cross section through a slightly modified form of pad, the dual elastic tires upon which it rests being indicated in dotted lines.

According to my invention the above results are secured by the use of metal pads 3, 3, preferably of a size and length to reach substantially across the treads of the tires, as indicated in Fig. 6, and which are connected together in a flexible band by a series of short chain sections, each of which chain sections is adjustable in length. The pad preferably is stamped up from a flat metal blank which has three perforations, 4, 14, and 4, the edges of these holes and the outer edges of the blank being cupped upward or outward to form flanges 5, 5, as shown. These flanges being formed by a stamping operation obviously must be either parallel, or must flare outwardly from the trough 6. In other words, the walls of said trough cannot lean inward and so form undercut recesses in which ice or frozen mud might pack, so that it would be extremely difficult to get it out. When the blank is thin, or sufficiently heavy presses are to be had in the process of manufacture to handle thick blanks, the pad may be stamped up out of a single blank, as indicated in Fig. 6, but if the heavier construction of pad is required, and sufficiently powerful presses are not obtainable, the pad may be stamped up out of two blanks nested one within the other, as clearly shown in Figs. 3 and 5. In such cases the two blanks are riveted together, as shown at 22, or otherwise fastened together. The stamping up of these flanges forms a series of grooves or depressions 6, in the face of the pad which is thus given a general form clearly shown in Fig. 3, capable of gripping the road surface most effectively, but having little destructive action upon a hard road surface or pavement, whether of asphalt or macadam.

To the bottom or inner face of each pad are riveted two stamped metal sections 7, 7, which when fastened together approximate the same general outline as the pad, and which are fastened to the under or inner side of the pad by the before mentioned rivets 22, or by any other convenient means. These bottom sections have flanges 8, 8, turned up on their inner ends, and between these flanges is preferably placed the liner 11. These bottom sections 7, 7, have openings 9, 9, which are concentric with, and of substantially the same size as, the holes 4, 4, in the pad proper.

The pads so formed are connected together by a series of double plate chain links, a similar set of these elements being attached to each pad 3. As shown, these chain elements each consists of a relatively long link 10, one end of which is pivoted to the pad at one side by a rivet 12, passing through holes in the flanges 8, 8, and liner 11, a relatively short link 13, which is pivoted to the other side of the pad by a similar rivet passing through other holes in flanges 8, 8, and liner 11, and an adjusting link 15, which is similarly pivoted to the short link 13. The ends of these rivets projecting beyond flanges 8, 8, have circumferential grooves cut in them to form recesses for receiving the plates of the chain links. After assembling the chain elements the heads of the rivets are upset or expanded to hold the links in place, all as shown in Fig. 4. The adjusting link 15, has a hole 23, intermediate of the two holes in its ends, all holes being of sizes to receive either one of the rivets 12, or the headed pivot pin 16. This pivot pin 16, passes through the holes in the outer end of the long link 10, and has a groove 17 in its projecting end adapted to engage the locking latch 18, which is pivoted to the link 10, at 19, has a slot 20 at one end adapted to engage the groove 17 in pin 16, and a recess 21 in the inner face of its other end adapted to snap over the end of the adjacent rivet 12, so as to lock the latch in the position of engagement shown in Fig. 4, and also shown in all except the upper portion of Fig. 2. The pad units are made up in the shop as illustrated in Figs. 3 and 4, with links attached, and can then be shipped to users and dealers in this shape.

The method of assembling a series of the pad units is to throw the spring latch 18, on each pad into the position shown in the upper end of Fig. 2, and insert between the plates of the long link 10, on one pad unit the adjusting link 15, of another pad unit, and then to insert the pivot pin 19, through the holes in the outer end of the link 10, and either through the end hole in the adjusting link 15, or through the intermediate hole 23, therein, according to how far the two pads are to be spaced apart. When the pin is in place the latch 18, is snapped into the position shown in Fig. 4, and in the lower portions of Fig. 2, thereby locking the pin 16, in position. When a connected strip of pad units is made up in this way long enough to reach around the particular wheel to which it is to be applied, the two ends are fastened together in the same way in position on the wheel and the device is complete. Usually in putting a new chain on a wheel having new tires the connecting pins will be passed through the outer holes in the adjusting links 15, and then as the tires wear down, or the chain stretches, the slack can be taken up from time to time by transferring the pin engagement of one or more pad units to the intermediate holes 23, of their adjusting links. Also if a chain is made up having the connecting pins passing through the intermediate holes 23, in a number of the adjusting links and is broken at any point while on the road, or if one of the pads is broken so as to produce an irregularity in the running of the wheel on the pavement, the broken unit can be removed, and to compensate for this the chain sufficiently lengthened by changing enough of the adjusting links so that engagement will take place with their end holes. Then the remaining pads and chain connection will reach around the wheel and form a satisfactory covering for the same, all the pads being substantially equally spaced. The truck can then safely proceed, at least until another unit can be obtained to replace the broken one.

It will be observed that the pads 3, are not stamped flat, but are formed on a curve, the arc of which is that of a circle whose center would be the center of the wheel and whose radius would be the distance from the wheel center to the face of the pad when in position on the wheel. While sets of shoes might be made up with different curvatures fitting exactly the necessary circle for each size of truck wheel, I prefer to make a standard pad which shall have the curvature which would be exactly right for the medium diameter of truck wheel and which consequently will not be very far out of the way for larger or smaller sizes of wheel.

It will also be observed in looking at Fig. 1 that the parts are so designed that even upon a hard and unyielding pavement at least two of the pads will engage the roadbed at the same time. Before the right hand pad of the two shown in engagement in Fig. 1 leaves the roadbed completely, when the wheel is rolling toward the left hand, the pad to the left of the left hand pad shown in engagement will begin to engage the roadbed. Consequently all jarring or chattering action upon the wheel and truck is avoided.

The holes 4, 4, extending through the pads and attached parts enable them to clear themselves of packed snow and mud and to consequently always present their flanges 5. to the roadbed in a reasonably free condition for effective gripping action.

To remove the chain from the wheel at any time one of the locking latches 18, is swung up, as shown at the upper end of Fig. 2, the pivot pin 16, pulled out and the parts separated at that point. The pin can then be placed back in the link and locked in position and the chain thrown into the locker where it will remain ready for prompt application to the wheel upon the next occasion for its use.

Having described my invention, I claim:

1. A traction pad for motor truck wheels comprising a metal blank having a plurality of perforations therein, the edges of the blank and the perforations being bent outwardly so as to present a plurality of flanges to the road surface, the trough-like depressions so formed in the face of the pad being free from under-cut spaces.

2. A traction device for automobiles, which comprises a plurality of similar units, each of which units comprises in combination a pad adapted to rest upon the surface of the wheel, a chain link pivoted to and projecting from each side of the pad and a third link pivoted in the outer extremity of one of the first mentioned links and provided with a plurality of holes for purposes of adjustment, together with a removable pin in the outer end of the other first mentioned link, whereby when a series of such units are assembled to form an endless band upon a wheel of a given size, the connecting pin of each unit may be inserted through either one or the other of the openings in the adjusting link of the adjacent unit, so as to produce an endless band of approximately the desired circumference.

3. In a non-skid traction device the combination of a pad comprising a stamped metal plate the edges of which are cupped outward relatively to the wheel in which they are to be placed, two stamped metal members riveted to the inner face of the pad and having in-turned flanges which are alined parallel to one another across the inner face of the pad, and a flexible chain pivoted to said inwardly projecting flanges.

4. A combination such as set out in claim 3, in which the free link of a given unit is longer than the other to which the adjusting link of that unit is pivoted, whereby that link on each unit to which the adjusting link of an adjacent unit is to be connected is long enough to receive said adjusting link in either of its two possible positions.

HEBRON BERNARD LAYMAN.